United States Patent [19]
Kirk et al.

[11] 3,959,024
[45] May 25, 1976

[54] SLIDE VALVE

[75] Inventors: Colin John Kirk; Malcolm John Searle, both of Twickenham, England

[73] Assignee: Martonair Limited, Twickenham, England

[22] Filed: Aug. 22, 1974

[21] Appl. No.: 499,477

[30] Foreign Application Priority Data
Sept. 29, 1973 United Kingdom............... 45639/73

[52] U.S. Cl..................... 137/625.25; 137/625.68; 251/282
[51] Int. Cl.² ........................................ F15B 13/04
[58] Field of Search................. 137/625.25, 625.67, 137/625.68; 251/281, 282, 283

[56] References Cited
UNITED STATES PATENTS

| | | | |
|---|---|---|---|
| 259,662 | 6/1882 | Brewer | 137/625.25 |
| 277,328 | 5/1883 | Murphy | 251/282 X |
| 358,799 | 3/1887 | Armstrong | 137/625.25 |
| 488,488 | 12/1892 | Toucey | 251/282 X |
| 696,718 | 4/1902 | Charles | 251/282 |
| 730,428 | 6/1903 | Wilson | 251/282 X |
| 3,004,555 | 10/1961 | Haberland | 251/282 X |
| 3,353,557 | 11/1967 | Faisandier | 251/282 X |
| 3,370,611 | 2/1968 | Flint | 137/625.25 |
| 3,530,893 | 9/1970 | Masuda | 137/625.25 |
| 3,595,274 | 7/1971 | Faisandier | 251/282 X |

*Primary Examiner*—Alan Cohan
*Assistant Examiner*—Gerald A. Michalsky
*Attorney, Agent, or Firm*—Gifford, Chandler & Sheridan

[57] ABSTRACT

A slide valve in which the valve member has an apertured interior partition extending in the direction of sliding movement of the valve member in a position intermediate a ported wall with which the valve member is engageable and a further wall of the housing containing a cavity, the surface areas of the partition on each side thereof being substantially equal, whereby fluid pressure inside the valve member is transmitted to the cavity through the apertured internal partition and acts on each side of the latter, thereby to hold the valve member in substantial fluid balance in a direction perpendicular to the ported wall and hence to reduce the force required to slide the valve member into and out of its operative positions.

2 Claims, 3 Drawing Figures

3,959,024

1

SLIDE VALVE

BACKGROUND OF THE INVENTION

I. Field of the Invention

The invention relates to a slide valve of the kind (hereinafter called the "kind described") comprising a hollow valve member arranged to slide in a housing against a wall thereof in which there are ports through which fluid flow is to be controlled by the valve member, the latter being slidable between operative positions in each of which different ports are bridged by valve member to effect flow of fluid between said ports through the interior of the valve member.

II. Description of the Prior Art

In a known slide valve of the foregoing kind the valve member has been held against the ported wall by a greater fluid force acting on the outside of the valve member than that acting in opposition to that force on the inside of the valve member. As a result of the greater fluid force acting on the outside of the valve member, a considerable effort is required to slide the valve member from one of its operative positions to another.

SUMMARY OF THE INVENTION

According to the present invention, comprising a hollow valve member, a housing containing the valve member and having a ported wall against which the valve member is slidable between operative positions, in each of which a different combination of ports in said ported wall is bridged by said valve member to effect flow of fluid between the ports through the interior of said valve member, the hollow valve member having transverse walls spaced apart in the direction of sliding of said valve member and dividing the interior of said valve member into a plurality of separate chambers, each said chamber having a partition therein extending in the direction of sliding of said valve member at a position therein spaced transversely of the valve member from said ported wall of said housing, each said internal partition having an aperture therein and a surface on each side of said internal partition of substantially equal area, whereby fluid pressure within the relevant chamber in said valve member is transmitted through said aperture in said internal partition and acts on each surface of said internal partition to hold said valve member in substantial fluid balance in a direction perpendicular to said ported wall and thereby to reduce the force required to slide said valve member between its operative positions, said housing having a further wall facing said ported wall and having therein a plurality of cavities communicating with the interior of said housing, the number of said cavities being equal to the number of chambers in said valve member, and sealing means bounding the periphery of each said cavity, whereby each said cavity communicates separately through a different chamber in said valve member with ports in said ported wall for each operative position of said valve member.

BRIEF DESCRIPTION OF THE DRAWINGS

A slide valve is now described by way of example with reference to the accompanying drawings, in which:-

DESCRIPTION OF THE PREFERRED EMBODIMENT

Figure 1:
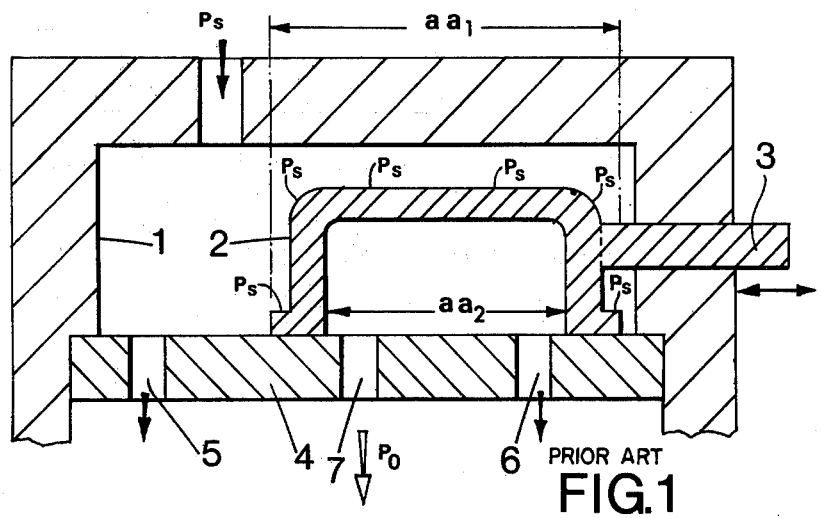
FIG. 1 is a longitudinal section through a known slide valve of the foregoing kind.

Referring firstly to FIG. 1, the known slide valve comprises a housing 1 containing a hollow valve member 2 carried by a slide rod 3. The housing is closed by a ported wall or platform 4 against which the valve member is slidable. The wall 4 contains two distributor ports 5 and 6 which lead to a pressure-responsive member to be controlled; for example, to opposite ends of a cylinder containing a piston to be controlled by the slide valve. The wall 4 also contains a port 7 leading to atmosphere or exhaust at a pressure $P_o$. The housing has an inlet port through which supply fluid at a higher pressure $P_s$ is admitted to the interior of the housing. The surface area of the outside of the valve member 2 which is subjected to the pressure $P_s$ is denoted by $aa_1$ and the surface area of the interior of the valve member 2 which is subjected to the pressure $P_o$ is denoted by $aa_2$. The area $aa_1$ is necessarily greater than the area $aa_2$ and therefore the valve member 2 is held against the ported wall 4 by a positive fluid pressure equal to $P_s \times aa_1 - P_o \times aa_2$. In the position illustrated the fluid at pressure $P_s$ supplied to the housing 1 is transmitted through the port 5 while the port 6 is in communication with exhaust at pressure $P_o$ through the port 7. When the valve member 2 has been moved by the rod 3 into a position in which the valve member bridges the ports 5 and 7, port 6 will receive fluid at pressure $P_s$ while port 5 will communicate with port 7 at the exhaust pressure $P_o$. In all positions the valve member will be held against the ported wall by the positive fluid force $= P_s \times aa_1 - P_o \times aa_2$ and therefore considerable effort is required to slide the valve member 2 into and out of its operative positions.

Figure 2:
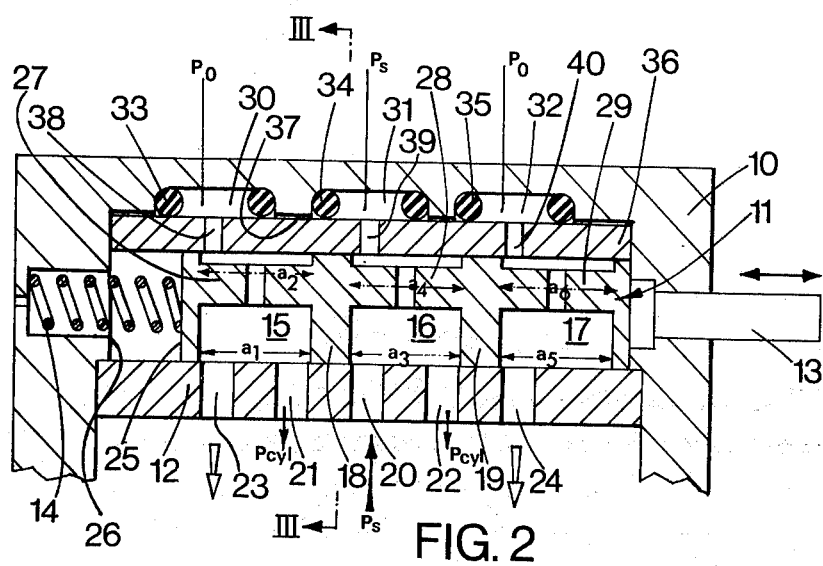
FIG. 2 is a similar section through the slide valve in accordance with this invention.
Figure 3:
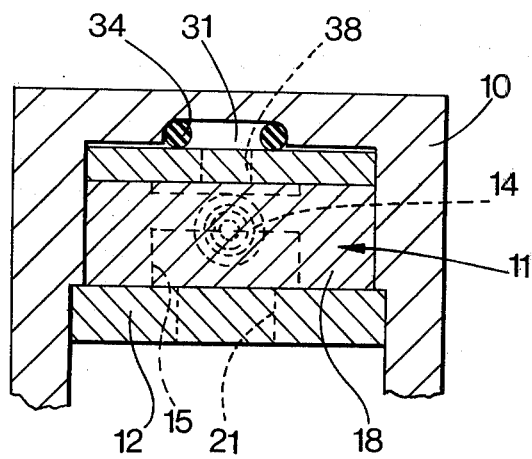
FIG. 3 is a section on the line III-III in FIG. 2.

Referring now to FIGS. 2 and 3, the housing 10 contains a valve member 11 which is slidable on a ported wall or platform 12 closing the housing. The valve member 11 is movable into and out of its operative positions by a slide rod 13 and is biased to the right as viewed in FIG. 2 by a spring 14. The valve member 11 is divided into three chambers 15, 16, 17 by transverse walls 18, 19. The ported wall 12 contains a supply port 20 for fluid at the supply pressure $P_s$. A pair of distribution ports 21 and 22, equivalent to the ports 5 and 6 in FIG. 1, and a pair of exhaust ports 23 and 24 communicating with atmosphere or exhaust at the pressure $P_o$. In the position illustrated, the supply pressure port 20 communicates with the distribution port 22 through the chamber 16, while the distribution port 21 communicates with the exhaust port 23 through the chamber 15. In the other operative position of the valve member 11 in which the left-hand end 25 of the piston 11 abuts the left-hand interior end wall 26 of the housing, the supply pressure port 20 communicates with the distribution port 21 through the chamber 16, while the distribution port 22 communicates with the exhaust port 24 through the chamber 17.

Each chamber 15, 16, 17 communicates through an apertured internal partition 27, 28 or 29 respectively with an appropriate one of three spaces 30, 31, 32 provided in a wall 37 of the housing 10 facing the ported wall 12. The spaces 30, 31, 32 are individually sealed from each other by sealing rings 33, 34, 35 retained in the respective spaces 30, 31, 32 and sealingly engaging a plate 36 having ports 38, 39, 40 therein positioned between the piston 11 and the housing wall 37. The surface areas of each side of the internal partitions 27, 28 and 29 are equal and as each partition is provided with an aperture, acting on each side of the partitions 27 and 29 is always $P_o$ and the pressure acting on each side of the partition 28 is always $P_s$. The fluid forces acting on the piston 11 transversely to the direction of sliding are therefore balanced as shown by the equation:

$$P_o (a_1 - a_2) + P_s (a_3 - a_4) + P_o (a_5 - a_6) = o,$$
where $a_1 = a_2 =$ surface area on each side of the partition 27;

$a_3 = a_4 =$ surface area on each side of the partition 28,
and $a_5 = a_6 =$ surface area on each side of the partition 29.

Therefore the force required to slide the valve member 11 into and out of its operative positions by means of the valve rod 13 is considerably smaller than that required in the known valve shown in FIG. 1.

Although the valve member 11 is shown divided into three chambers 15, 16 and 17, another number of chambers may be required for a different arrangement of ports in the wall or platform 12, the number of spaces 30, 31, 32 and the number of ports in the plate 36 being equal to the number of chambers into which the valve member 11 is divided.

What we claim as our invention and desire to secure by Letters Patent of the United States is:

1. A slide valve comprising a hollow valve member, a housing containing the valve member and having a ported wall against which the valve member is slidable between operative positions, in each of which a different combination of ports in said ported wall is bridged by said valve member to effect flow of fluid between the ports through the interior of said valve member, the hollow valve member having transverse walls spaced apart in the direction of sliding of said valve member and dividing the interior of said valve member into a plurality of separate chambers, each said chamber having a partition therein extending in the direction of sliding of said valve member at a position therein spaced transversely of the valve member from said ported wall of said housing, each said internal partition having an aperture therein and a surface on each side of said internal partition of substantially equal area, whereby fluid pressure within the relevant chamber in said valve member is transmitted through said aperture in said internal partition and acts on each surface of said internal partition to hold said valve member in substantial fluid balance in a direction perpendicular to said ported wall and thereby to reduce the force required to slide said valve member between its operative positions, said housing having a further wall facing said ported wall and having therein a plurality of cavities communicating with the interior of said housing, the number of said cavities being equal to the number of chambers in said valve member, sealing means bounding the periphery of each said cavity, and a bearing plate positioned between the valve member and said further wall, said bearing plate having ports therein effecting communication through the internal partitions in said valve member between the chambers therein and the sealed cavities in said further wall, said valve member slidable between said bearing plate and ported wall.

2. A slide valve as claimed in claim 1 in which said sealing means bounding each cavity in said further wall is a compressible ring located in each cavity and deformed between said bearing plate and said further wall to effect a peripheral seal.

* * * * *

UNITED STATES PATENT AND TRADEMARK OFFICE
CERTIFICATE OF CORRECTION

PATENT NO. : 3,959,024
DATED : May 25, 1976
INVENTOR(S) : Colin John Kirk et al

It is certified that error appears in the above—identified patent and that said Letters Patent are hereby corrected as shown below:

Column 3, line 5, before "acting" insert --the pressure--.

Column 4, line 33, before "parted" insert --said--.

Signed and Sealed this

Third Day of August 1976

[SEAL]

Attest:

RUTH C. MASON
Attesting Officer

C. MARSHALL DANN
Commissioner of Patents and Trademarks